(12) United States Patent
Porter (10) Patent No.: US 7,325,744 B2
(45) Date of Patent: Feb. 5, 2008

(54) MEMORY CARD HOLDER DEVICE

(76) Inventor: Arthur James Porter, 1067 E. 100 S., Lindon, UT (US) 84042

( * ) Notice: Subject to any disclaimer, the term of this patent is extended or adjusted under 35 U.S.C. 154(b) by 0 days.

(21) Appl. No.: 11/030,428

(22) Filed: Jan. 6, 2005

(65) Prior Publication Data

US 2005/0150961 A1   Jul. 14, 2005

Related U.S. Application Data

(60) Provisional application No. 60/535,325, filed on Jan. 9, 2004.

(51) Int. Cl.
G06K 7/00   (2006.01)

(52) U.S. Cl. .................................. 235/486

(58) Field of Classification Search ............ 235/487, 235/486, 451; 206/38.1, 39, 232, 804, 815, 206/308.1; 150/147; 361/801, 802, 737, 361/752
See application file for complete search history.

(56) References Cited

U.S. PATENT DOCUMENTS

| | | | | |
|---|---|---|---|---|
| 4,674,628 A * | 6/1987 | Prinsloo et al. ............ | 206/38.1 |
| 4,817,253 A * | 4/1989 | Harmatuik ................... | 24/458 |
| 5,060,794 A * | 10/1991 | Linn et al. .................... | 206/232 |
| 5,276,317 A | 1/1994 | Ozouf et al. ................. | 235/486 |
| 5,467,871 A | 11/1995 | DeField ....................... | 206/232 |
| 5,473,145 A | 12/1995 | Wallerstorfer et al. ...... | 235/382 |
| 5,538,291 A | 7/1996 | Gustafson .................... | 235/487 |
| 5,544,510 A | 8/1996 | Botteon et al. ............... | 70/456 |
| 5,697,498 A * | 12/1997 | Weisburn et al. ......... | 206/308.1 |
| 5,863,466 A * | 1/1999 | Mor .......................... | 252/500 |
| D419,289 S * | 1/2000 | Edwards ...................... | D3/208 |
| 6,275,383 B1* | 8/2001 | Bohm ........................ | 361/752 |
| D453,515 S | 2/2002 | Brewer et al. .............. | D14/436 |
| 6,427,918 B1* | 8/2002 | Endejan et al. ............. | 235/486 |
| 6,447,140 B1 | 9/2002 | Lu ............................. | 362/109 |
| 6,581,762 B2* | 6/2003 | Keough ..................... | 206/39.4 |
| 6,594,154 B1 | 7/2003 | Brewer et al. .............. | 361/801 |
| 6,766,952 B2* | 7/2004 | Luu ........................... | 235/451 |
| 6,782,998 B2* | 8/2004 | Koren ......................... | 206/39 |

(Continued)

FOREIGN PATENT DOCUMENTS

JP   2001222695   8/2001

OTHER PUBLICATIONS

"Contemporary Memory Card Holder" http://yomimedia.net/shop/popup_image.php?pID=72, no date.

Primary Examiner—Daniel Stcyr
Assistant Examiner—April A. Taylor
(74) Attorney, Agent, or Firm—Kunzler & McKenzie (57) ABSTRACT

An apparatus and system are disclosed for storing an electronic memory card. The apparatus, in one embodiment, is a memory card holder configured to removably retain a memory card within the cavity of a housing. The memory card holder may include a housing that resembles a recognizable electronic device (such as a PDA, a digital camera, or the like) but is natively inoperative as an electronic device, a cavity formed within the housing, and a retaining mechanism positioned within the cavity to removably retain a memory card. The memory card holder may further include an aperture integrally formed in the housing for attaching the housing to an object, such as a key chain, bag, string, or the like.

18 Claims, 6 Drawing Sheets

U.S. PATENT DOCUMENTS

| | | | |
|---|---|---|---|
| 6,871,682 B2* | 3/2005 | Hogganvik | 150/149 |
| 2002/0109982 A1 | 8/2002 | Lu | 362/109 |
| 2002/0117243 A1 | 8/2002 | Koren | 150/147 |
| 2003/0002277 A1 | 1/2003 | Lu | 362/109 |
| 2003/0010829 A1 | 1/2003 | Krygier | 235/487 |
| 2003/0033738 A1 | 2/2003 | Lii | 40/364 |
| 2003/0085285 A1 | 5/2003 | Luu | 235/486 |

* cited by examiner

MEMORY CARD HOLDER DEVICE

CROSS-REFERENCES TO RELATED APPLICATIONS

This application claims priority to U.S. Provisional Patent Application No. 60/535,325 entitled "KEY CHAIN MEMORY CARD HOLDER" and filed on Jan. 9, 2004 for Arthur James Porter, which is incorporated herein by reference.

BACKGROUND OF THE INVENTION

1. Field of the Invention

This invention relates to electronic memory cards and more particularly relates to memory card holders.

2. Description of the Related Art

Interchangeable information and/or memory cards are currently known and used in conjunction with many types of electronic devices. Examples of such electronic cards include Subscriber Identity Module card (SIM cards), MultiMedia cards (MMCs), secure digital (SD) memory cards, SmartMedia™ cards, compact flash, memory sticks, Memory Stick Duo™, xD™ cards, and the like. The various types of memory cards typically differ in size and storage capacity and may contain flash memory or other types of non-volatile memory. For clarity the term "memory card" as used herein generally refers to all such interchangeable information and/or memory cards.

Memory cards beneficially provide a removable storage medium capable of high storage density. In general, memory cards are relatively small and may be easily swapped from one electronic device to another. Small portable electronic devices, such as portable digital assistants (PDA), digital cameras, cellular phones, audio players, and the like, typically use memory cards to retain identification information, store and access data files, programs, audio files, image files, video files, and the like. Memory cards consequently enable electronic devices to provide increased storage capacity and great flexibility in exchanging information and storing data files, thereby enhancing the functionality of the device that utilizes files on the memory card.

The relatively small size of memory cards facilitates providing small, powerful portable electronic devices. However, memory cards may also be easily misplaced or damaged. Various memory card holders that offer some protection to stored memory cards are currently available in the market. For example, a small box-like plastic holder that accommodates a single memory card may prevent the memory card from becoming bent or broken. Yet, the holder may also get lost in a purse or bag just as easily as the memory card. Other larger holders may provide storage space for multiple memory cards, but the holders are typically designed to hold only one type of memory card. A user of various types of memory cards may have difficulty storing and keeping track of different-sized memory cards, especially if all of the memory card holders look similar. There may also be additional costs required to purchase multiple card holders for two or more cards of different sizes, because the card holders that hold multiple memory cards currently only hold one size each.

From the foregoing discussion, it should be apparent that a need exists for an apparatus and system that conveniently stores memory cards of varying sizes. Beneficially, such an apparatus and system would provide a suitable protective housing for safely storing memory cards and would also provide aesthetic value. The apparatus and system would further be attachable to another object to prevent losing or misplacing memory cards.

SUMMARY OF THE INVENTION

The present invention has been developed in response to the present state of the art, and in particular, in response to the problems and needs in the art that have not yet been fully solved by currently available memory card holders. Accordingly, the present invention has been developed to provide an apparatus and system for storing an electronic memory card that overcome many or all of the above-discussed shortcomings in the art.

The apparatus, in one embodiment, is a memory card holder configured to removably retain a memory card within the cavity of a housing. The memory card holder may comprise a housing that resembles a recognizable electronic device (such as a PDA, a digital camera, or the like) but is natively inoperative as an electronic device, a cavity formed within the housing, and a retaining mechanism positioned within the cavity to removably retain a memory card. The memory card holder may further comprise an aperture integrally formed in the housing for attaching the housing to an object, such as a key chain, bag, string, or the like.

The housing may further comprise a plurality of casing members. In one embodiment, a first casing member is hinged to a second casing member. Consequently, the housing may be opened and closed to limit access to the stored memory cards. The casing members may include opposing sidewalls and a bottom wall. In addition, a securing mechanism attached to the casing members, in select embodiments, secures the housing in a closed position.

The memory card holder is further configured, in one embodiment, to provide a plurality of partitions disposed within the cavity. The partitions maybe removable and may be stored side-to-side. In a contemplated embodiment, the partitions comprise a planar member hinged to a mounting, and a clip for engaging memory cards of varying sizes. Thus, the memory card holder may be used to organize and store various types of memory cards.

A system of the present invention is also presented to store one or more electronic memory cards. The system may be embodied in a memory card holder that includes a housing resembling a recognizable electronic device but natively inoperative as an electronic device, a cavity formed within the housing, a memory card, and a retaining mechanism for removably retaining the memory card within the cavity. In particular, the system, in one embodiment, includes a memory card that may be selected from the group consisting of SIM cards, MMCs, SD memory cards, SmartMedia™ cards, memory sticks, Memory Stick Duo™, and xD™ cards.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The memory card holder of the present invention retains memory cards of different sizes within a protective housing. The housing, which may resemble an electronic device, may be attached to another object to prevent the memory cards from becoming lost. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of embodiments of the invention.

One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
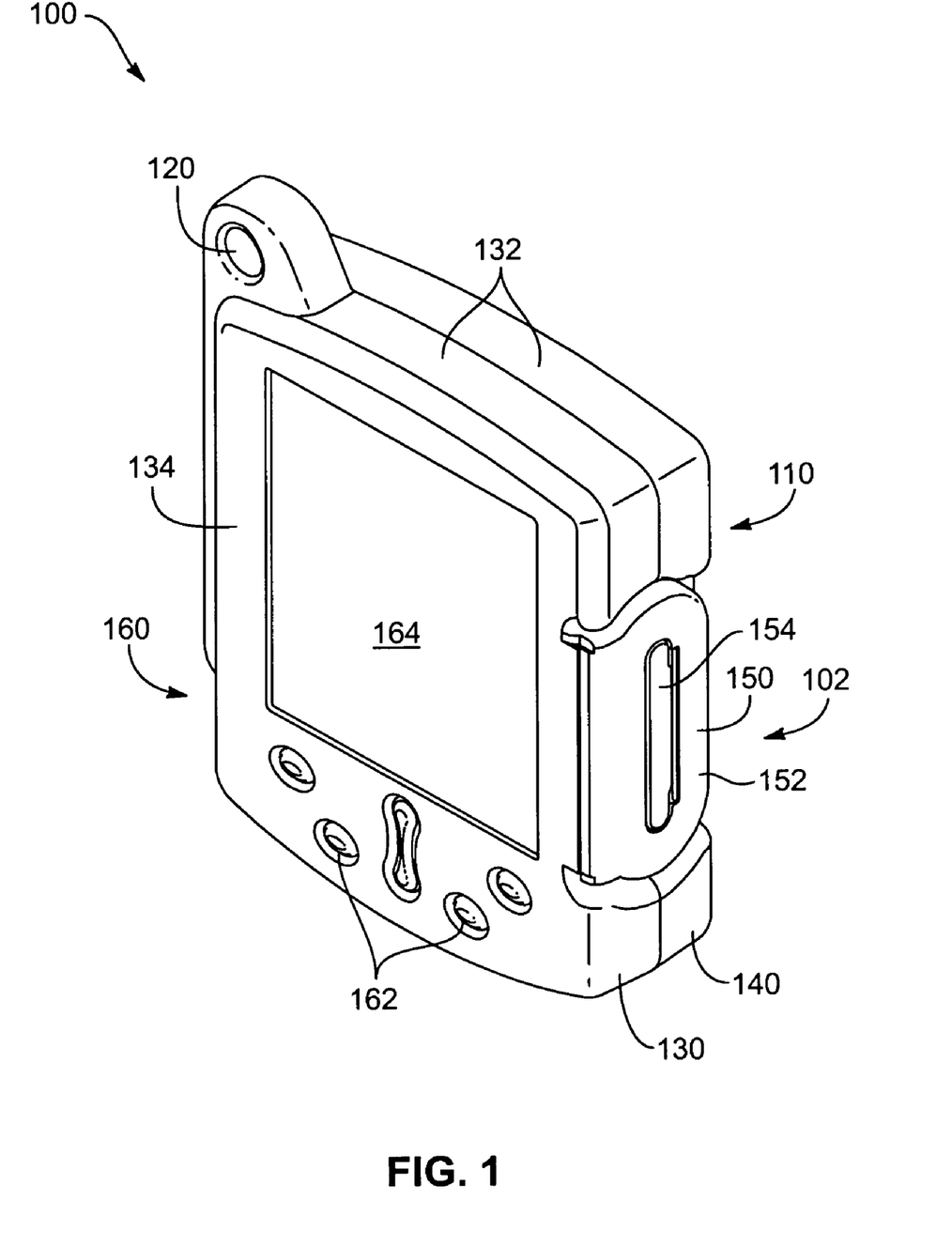
FIG. 1 is a perspective view of one embodiment of a memory card holder of the present invention that resembles a PDA device.

FIG. 1 illustrates one embodiment of a memory card holder 100 of the present invention in a closed position 102. The memory card holder 100 as depicted comprises a housing 110, an aperture 120, a first casing member 130, a second casing member 140, a securing mechanism 150, and a face 160. The memory card holder 100 functions as an enclosure for conveniently housing electronic memory cards, such as Subscriber Identity Module card (SIM cards), MultiMedia cards (MMCs), secure digital (SD) memory cards, SmartMedia™ cards, compact flash, memory sticks, Memory Stick Duo™, xD™ cards, and the like.

The housing 110 provides the outer protective casing to enclose the memory cards. The interior of the housing 110 preferably comprises a cavity (not shown) to accommodate the cards. In addition, a retaining mechanism (not shown) within the cavity may retain one or more memory cards within the cavity. Consequently, the housing 110 protects the memory cards from becoming damaged or lost.

In certain embodiments, the housing 110 resembles a recognizable electronic device. For example, in the illustrated embodiment, the memory card holder 100 resembles a PDA (portable digital assistant). The face 160 of the housing 110 may include buttons 162, a screen 164, and other similar characteristic devices to enhance the appearance of the housing 110, which may resemble an actual electronic device in certain embodiments. However, the memory card holder 100 is preferably inoperative as an electronic device to provide sufficient storage space for one or more memory cards.

In one embodiment, the designated area for the screen 164 may include a writable surface to enable the user to make a record of the memory cards contained within the memory card holder 100. The buttons 162 may function for aesthetic purposes only. In alternative embodiments, the housing 110 may resemble other recognizable electronic devices, such as a digital camera, telephone, audio player, and the like. In one embodiment, the housing 110 may further include one or more symbolic elements such as a picture, logo, company information, advertisement, or the like. The unique appearance of the housing 110 may facilitate organizing and storing memory cards of various types.

The housing 110 may be made out of a rigid or semi-rigid material such as metal or molded plastic respectfully, though many different materials may be suitable for the housing 110. In one embodiment, the housing 110 is made out of polypropylene and may be colored for aesthetic purposes. In a contemplated embodiment, the housing 110 further contains a non-static material to further protect stored memory cards. One example of a non-static additive includes a compound known as Larostat HTS 905, which is commonly used in engineered thermoplastics, flexible PVC, polypropylene, textiles, and dust control. Other common non-static additives may also be used. Those of skill in the art will recognize that the housing 110 may be made of various materials or compounds and is not, therefore, limited to the illustrated embodiments.

In select embodiments, an integrated aperture 120 is formed in the housing 110 to provide an anchor for attaching the memory card holder 100 to another object, such as a bag, key chain, strap, or the like. Alternatively, other mechanisms such as Velcro®, a clip, and the like may be used to fasten the memory card holder 100 to a desired object. Consequently, the memory card holder 100 and the stored memory cards may be conveniently secured in a known location to prevent loss of the memory cards.

The housing 110 may further comprise a plurality of casing members 130, 140. In one embodiment, a first casing member 130 corresponds to a second casing member 140. The first and second casing members 130, 140 may include sidewalls 132 and a bottom wall 134. The corresponding sidewalls 132 may be attached. In one embodiment, a plastic hinge connects a sidewall 132 of a first casing member 130 to a side wall 132 of a second casing member 140. Consequently, the housing 110 may be opened and closed like a door. Alternatively, the first casing member 130 may fit on top of the second casing member 140 like a lid. In a further embodiment, multiple casing members 130, 140 may be configured to stack on top of each other to increase the number of memory cards that may be stored within the housing 110.

A securing mechanism 150 may further secure the housing 110 in the closed position 102. In the depicted embodiment, the securing mechanism 150 attaches the first casing member 130 to the second casing member 140, thereby locking the housing 110 in the closed position 102. In one embodiment, a latch 152 attached to the first casing member 130 engages a protrusion 154 formed in the second casing member 140. Alternatively, other forms of locks or securing devices known in the art may be used. The securing mechanism 150 prevents memory cards from inadvertently escaping the housing 110.

Figure 2:
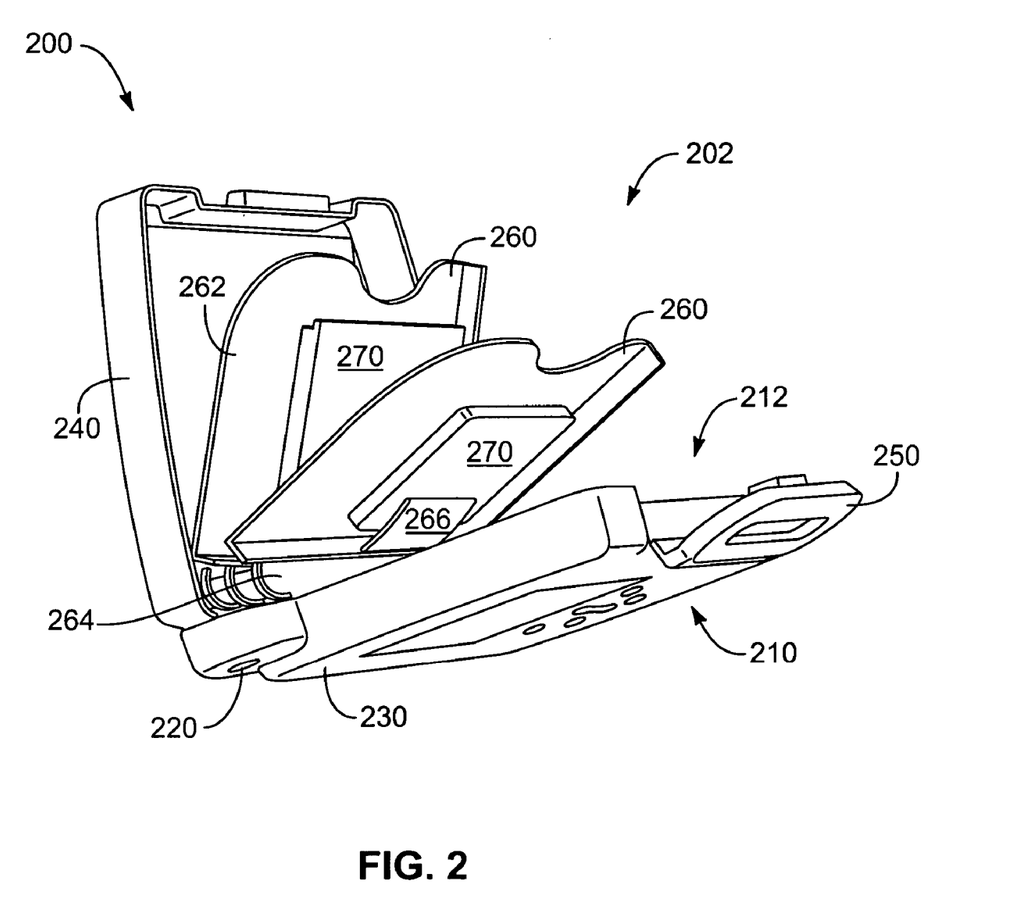
FIG. 2 is a perspective view of one embodiment of a memory card holder of the present invention in an open position.

FIG. 2 illustrates one embodiment of a memory card holder 200 of the present invention in an open position 202. The memory card holder 200 as depicted includes a housing 210, a cavity 212, an aperture 220, a first casing member 230, a second casing member 240, a securing mechanism 250, partitions 260, and memory cards 270. In an open position 202, memory cards 270 may be easily inserted and removed from the partitions 260 disposed within the cavity 212 of the housing 210.

Partitions 260 may represent one suitable form of a retaining mechanism for removably retaining the memory cards 270 within the cavity 212. In the depicted embodiment, the partitions 260 comprise a planar member 262 hinged to a mounting 264. Consequently, the user may be able to leaf through the stored memory cards 270 to easily view the available selection. A clip 266 may engage the memory cards 270. In certain embodiments, the partitions 260 may be removable, thereby enabling the user to easily select and arrange stored memory cards 270.

In one embodiment, the user may store up to three different memory cards 270 within a housing 210. Of course, the size of the memory card holder 200 and the number of memory cards 270 stored may vary. The partitions 260 as illustrated accommodate memory cards 270 of different types and sizes. A hinge (not shown) between the first casing member 230 and the second casing member 240 enables the user to easily transition the housing 210 between the open position 202 and the closed position 102 of FIG. 1.

Figure 3:
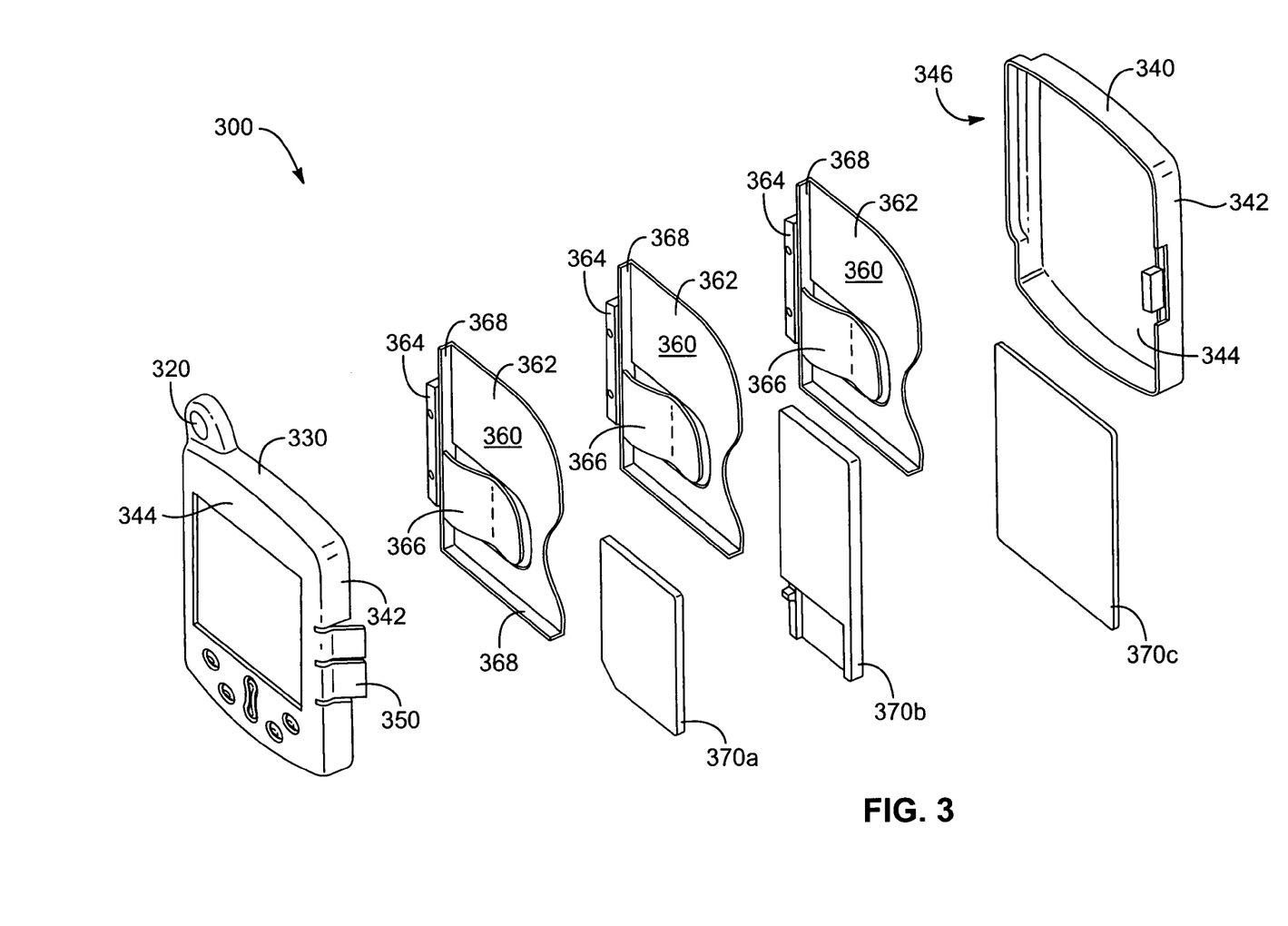
FIG. 3 is an exploded view of one embodiment of a memory card holder of the present invention.

FIG. 3 illustrates an exploded view of one embodiment of a memory card holder 300 of the present invention. In the depicted embodiment, the memory card holder 300 comprises an aperture 320, a first casing member 330, a second casing member 340, a securing mechanism 350, partitions 360, and memory cards 370. The various functional components of the memory card holder 300 are illustrated in greater detail.

The first and second casing members 330, 340 may comprise sidewalls 342 and a bottom wall 344 to form a cavity 346. The partitions 360, in one embodiment, each contain a separate mounting 364 to enable removal of the partitions 360. A clip 366 may be connected to one or more side walls 368 of the partition 360. To secure the memory cards 370, a memory card 370 may be inserted between the planar member 362 and the clip 366.

The partitions 360 may additionally be configured to retain a variety of memory cards 370a-c. For example, memory card 370a may represent an SD memory card with dimensions of about 32 mm long, 24 mm wide, and 2.1 mm thick. Memory card 370b may be a memory stick measuring about 50 mm long, 21.5 mm wide, and 2.8 mm thick; and memory card 370c may represent a SmartMedia™ card measuring about 45 mm long, 37 mm wide, and 0.7 mm thick. In the depicted embodiment, each card slides into a partition 360 and is retained between the clip 366 and the planar member 362. The clip 366 is positioned to frictional engage the memory cards 370a-c regardless of the size or type. In addition, one or more free edges on the planar member 362 may facilitate storing the variously sized cards 370a-c within the memory card holder 300.

Figure 4A:
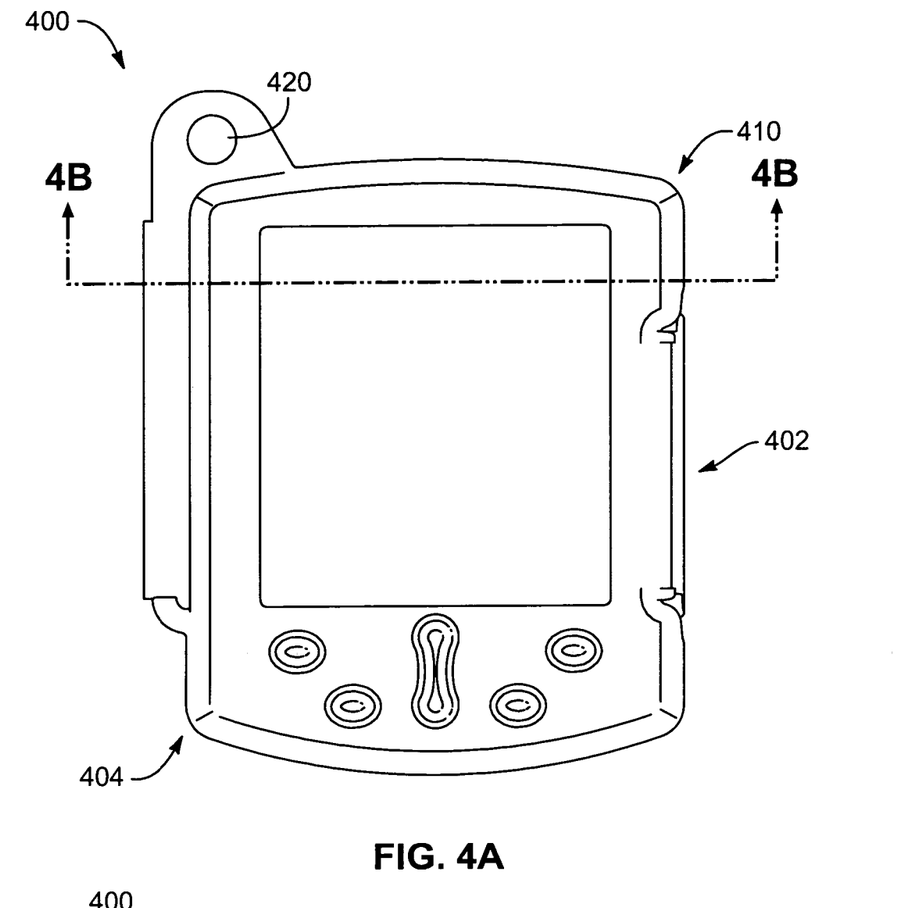
FIG. 4A is a front view of one embodiment of a memory card holder of the present invention.

FIG. 4A illustrates a front view of one embodiment of a memory card holder 400 of the present invention in a closed position 402. As mentioned previously, the face 404 of the housing 410 may resemble the face of a recognizable electronic device, such as a PDA or the like. The aperture 420 may facilitate attaching the memory card holder 400 to another object.

Figure 4B:
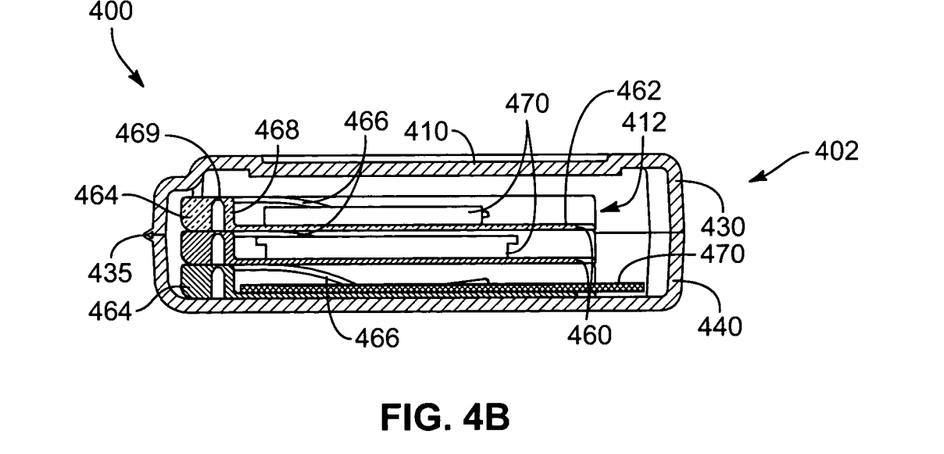
FIG. 4B is a cross-sectional view of the memory card holder of FIG. 4A containing memory cards of different types.

FIG. 4B illustrates a cross-sectional view of the memory card holder 400 described in relation to FIG. 4A. The memory card holder 400 may include a housing 410, a first casing member 430, a second casing member 440, partitions 460, and memory cards 470. In a closed position 402, the partitions 460 may be stored side-to-side and may include a planar member 462, a mounting 464, a clip 466, and sidewalls 468. Furthermore, the different sized memory cards 470 may be stored between the planar members 462 and the clips 466. As illustrated, the memory cards 470 may extend different lengths across the planar members 462. In addition, the clips 466 adapt to the various thicknesses of the memory cards 470.

In the depicted embodiment, the mounting 464 is hinged to the sidewall 468 by a plastic hinge 469, thus enabling the planar members 462 to rotate as illustrated in FIG. 2. A plastic hinge 435 may also connect the first casing member 430 to the second casing member 440. Of course, other hinges known to those skilled in the art may or may not be used to connect the previously mentioned components.

Figure 5A:
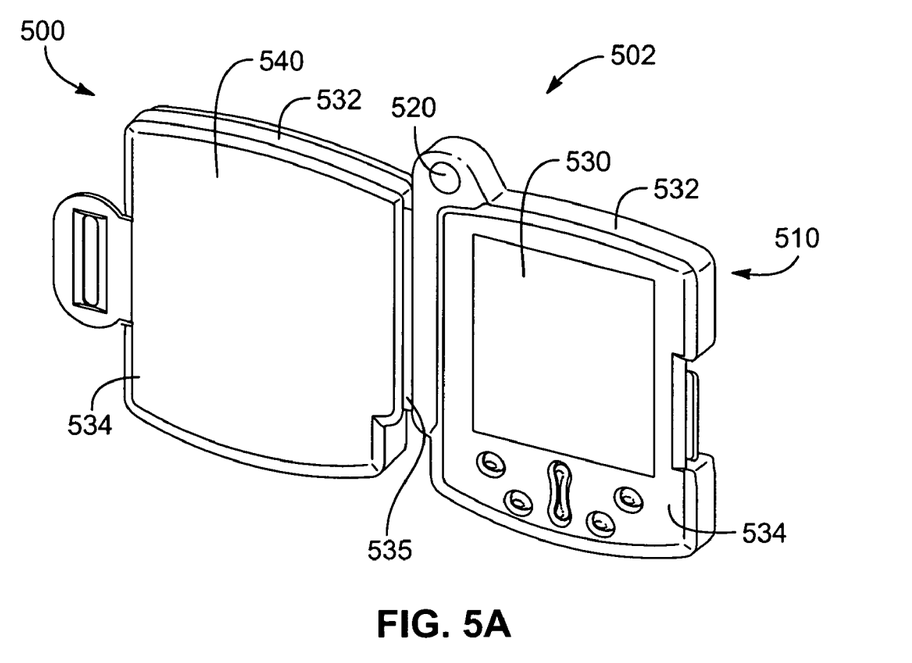
FIG. 5A is a perspective view of one embodiment of a memory card holder of the present invention in an open position.
Figure 5B:
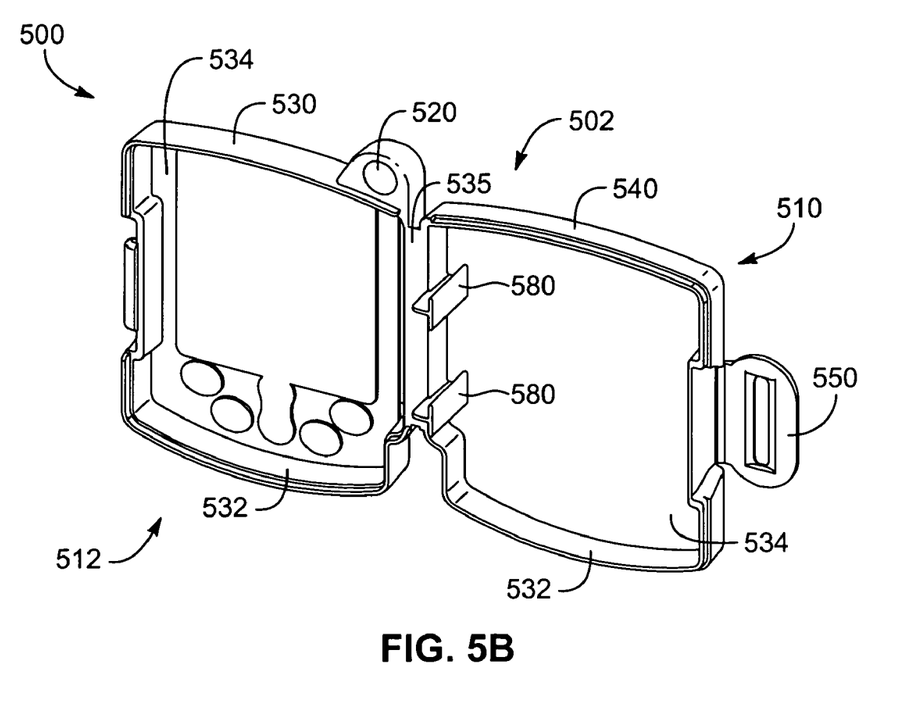
FIG. 5B is a perspective view of one embodiment of an interior cavity of a housing in accordance with the present invention.

FIGS. 5A-5B illustrate one embodiment of a memory card holder 500 of the present invention in an open position 502. The memory card holder 500 as depicted includes a housing 510, an aperture 520, a first casing member 530, a second casing member 540, and a securing member 550. A plastic hinge 535 may connect sidewalls 532 of the casing members 530, 540.

FIG. 5B is a perspective back view illustrating one embodiment of an interior cavity 512 of the housing 510. The sidewalls 532 and the bottom walls 534 form the cavity 512. In the depicted embodiment, protrusions 580 are provided for removably attaching partitions such as those described in FIGS. 2-4. The protrusions 580 may be T-shaped and may be attached to the bottom wall 534 and/or side wall 532. Those of skill in the art will recognize that many shapes, forms, and/or mechanisms may be used to attach, permanently or temporarily, one or more partitions to the housing 510.

Figure 6:
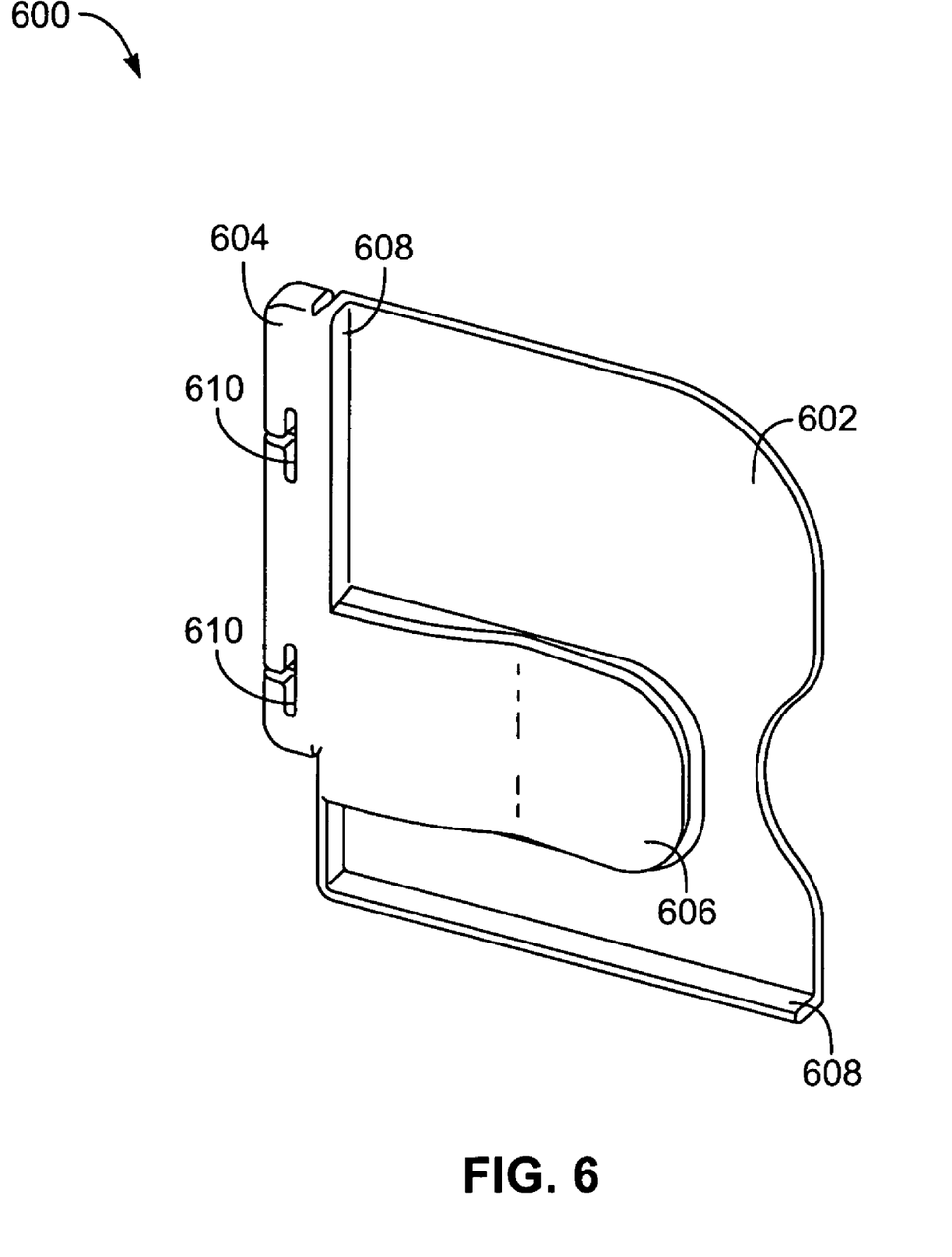
FIG. 6 is a perspective view of one embodiment of a partition in accordance with the present invention.

FIG. 6 illustrates one embodiment of a partition 600 that comprises corresponding slots 610 suitable for receiving protrusions 580 of FIG. 5B. The partition 600 may comprise a planar member 602, a mounting 604, a clip 606, and sidewalls 608. The slots 610 may be T-shaped and may be formed in the mounting 604. The protrusions 580 may be inserted through the slots 610 to retain the partitions 600 in a fix position until the partitions 600 are removed from the cavity 512 (FIG. 5B) of the memory card holder 500. In one embodiment, multiple partitions 600 may be stacked on top of each other to store the partitions 660 side-to-side. Furthermore, the mounting 604 may be adequately secured to the protrusions 580 such that the planar member 602 may be rotated about the mounting 604 as illustrated in FIG. 2.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electronic memory card holder, the apparatus comprising:
    a housing having a shape and appearance of an electronic device selected from a personal digital assistant, a digital camera, an audio player, and a cellular phone, but natively inoperative as an electronic device;
    a cavity formed within the housing;
    a retaining mechanism positioned within the cavity, the retaining mechanism designed to removably retain a memory card within the cavity, wherein memory card dimensions do not exceed 42.8 millimeters by 36.4 millimeters by 3.3 millimeters;
    a plurality of partitions disposed within the cavity, each partition having at least one side wall and a planar member constructed of a non-static material; and
    wherein the partition further comprises a clip connected to the sidewall and configured to removably retain a memory card against the planar member and within the cavity.

2. The apparatus of claim 1, further comprising an aperture integrally formed in the housing for attaching the housing to an object.

3. The apparatus of claim 1, wherein the plurality of partitions are stored side-to-side.

4. The apparatus of claim 1, wherein the clip is configured to frictionally engage memory cards of varying length, width and thickness.

5. The apparatus of claim 1, wherein the partition is removably connected to the housing.

6. The apparatus of claim 1, wherein the partition comprises a mounting hinged to a planar member.

7. The apparatus of claim 6, wherein the mounting comprising one or more slots for attaching the mounting to the housing.

8. The apparatus of claim 7, wherein the housing further comprises one or more protrusions configured to engage one or more slots in the partition.

9. The apparatus of claim 1, wherein the housing comprises polypropylene.

10. The apparatus of claim 9, wherein the housing further comprises a non-static material.

11. The apparatus of claim 10, wherein the non-static material is Larostat HTS 905.

12. The apparatus of claim 1, wherein the housing comprises a first casing member attached to a second casing member, the first and second casing members having opposing sidewalls and a bottom wall.

13. The apparatus of claim 12, wherein a sidewall of the first casing member is hinged to a sidewall of the second casing member.

14. The apparatus of claim 12, further comprising a securing mechanism configured to secure the housing in a closed position.

15. The apparatus of claim 14, wherein the securing mechanism connects the first casing member to the second casing member.

16. A system for storing an electronic memory card, the system comprising:
    a housing;
    a cavity formed within the housing;
    the memory card; and
    a plurality of partitions disposed within the cavity, each partition having at least one side wall, a planar member, and a clip connected to the sidewall and configured to removably retain a memory card against the planar member and within the cavity.

17. The system of claim 16, wherein the memory card is selected from the group consisting of SIM cards, MMCs, SD memory cards, SmartMedia™ cards, memory sticks, Memory Stick Duo™, and xD™ cards.

18. An electronic memory card holder, the apparatus comprising:
    a housing having the shape of an electronic device selected from a personal digital assistant, a digital camera, an audio player, and a cellular phone, but natively inoperative as an electronic device, the housing comprising a first casing member hinged to a second casing member;
    an aperture integrally formed in the housing for attaching the housing to an object;
    a cavity formed within the housing;
    a plurality of partitions disposed within the cavity, each partition having at least one side wall, a planar member constructed of a non-static material, and a clip connected to the sidewall and configured to removably retain a memory card against the planar member and within the cavity, wherein memory card dimensions do not exceed 42.8 millimeters by 36.4 millimeters by 3.3 millimeters; and
    a securing mechanism configured to secure the first casing member to the second casing member in a closed position.

* * * * *